(12) United States Patent
Ichiman

(10) Patent No.: US 6,918,596 B2
(45) Date of Patent: Jul. 19, 2005

(54) SEAL WITH INTEGRATED SEALING AND ROTATION MEASURING CAPABILITIES

(75) Inventor: Shinzaburo Ichiman, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/658,365

(22) Filed: Sep. 10, 2003

(65) Prior Publication Data

US 2004/0046328 A1 Mar. 11, 2004

(30) Foreign Application Priority Data

Sep. 10, 2002 (JP) ........................................ 2002-263589

(51) Int. Cl.[7] ............................................... F16J 15/32
(52) U.S. Cl. ......................... 277/571; 277/572; 384/448
(58) Field of Search ................................ 277/549, 571, 277/572; 384/448

(56) References Cited

U.S. PATENT DOCUMENTS

| | | | |
|---|---|---|---|
| 4,968,156 A | * | 11/1990 | Hajzler ....................... 384/448 |
| 5,530,344 A | * | 6/1996 | Caillaut et al. .............. 324/174 |
| 5,898,388 A | * | 4/1999 | Hofmann et al. ....... 340/870.31 |
| 6,559,633 B1 | * | 5/2003 | Nachtigal et al. ............ 324/174 |
| 6,573,705 B1 | * | 6/2003 | Tajima et al. ................ 324/174 |

* cited by examiner

Primary Examiner—Enoch Peavey
(74) Attorney, Agent, or Firm—Wenderoth, Lind & Ponack, L. L. P.

(57) ABSTRACT

A seal with integrated sealing and rotation measuring capabilities includes a first slinger having an L-shaped cross section and is adapted to be fixed to a rotational bearing element of a bearing assembly, the first slinger including a first cylindrical portion extending axially and a first flanged portion extending radially from the first cylindrical portion. A seal ring is arranged axially inward from the first slinger and is adapted to be secured to a non-rotational bearing element, and the seal ring has elastic seal lips having respective tips adapted to make sliding contact with the side of the first slinger facing the seal ring. A second slinger has an L-shaped cross section arranged axially inward from the said seal ring and is adapted to be fixed to the rotational bearing element. The second slinger includes a second cylindrical portion extending axially and a second flanged portion extending radially from the second cylindrical portion.

18 Claims, 2 Drawing Sheets

SEAL WITH INTEGRATED SEALING AND ROTATION MEASURING CAPABILITIES

BACKGROUND OF THE INVENTION

1. Field of the Invention

The present invention relates to a seal construction for use in sealing a wheel support bearing assembly that includes two bearing elements rotating relative to each other. More particularly, the invention relates to a seal construction that includes a rotation detect device that may be used in conjunction with the wheel control system on an automotive vehicle for detecting the number of revolutions for each of the front and rear, left and right wheels on the automotive vehicle.

2. Prior Art

A conventional wheel rotation detect apparatus is often used with the anti-locking/skidding system that is designed to prevent the wheel locking or skidding on an automotive vehicle, and includes an encoder that is actuated magnetically to generate pulses, and a sensor that is disposed to face opposite the encoder for sensing the pulses from the encoder. An example of such a wheel rotation detect apparatus is disclosed in the French patents Nos. 2558223 and 2574501.

The wheel rotation detect apparatus disclosed in the above French patents is usually used in conjunction with a sealing device that is provided for sealing the wheel support bearing assembly. Recently, the wheel rotation detect apparatus has been developed as a seal with integrated sealing and rotation measuring capabilities, and has been used for practical purposes. More recently, the sealing device has been developed as a combination seal that consists of a plurality of sealing members that provide high sealing capability. The encoder that may be used with such sealing device has become larger in size for those recent years.

By referring now to FIG. 3, a typical example of such a seal with integrated sealing and rotation measuring capabilities will be described below. The seal with integrated sealing and rotation measuring capabilities is installed on the wheel support bearing assembly on an automotive vehicle that includes a rotational bearing element 1 and a non-rotational bearing element 2 rotating relative to each other, and provides sealing capability for the bearing assembly as well as the capability of detecting the number of revolutions for the wheel.

More specifically, this seal is provided in the form of a combination seal that includes a metallic slinger 22 having an L-shape cross section and a metallic seal ring 25. The slinger 22 includes a cylindrical portion 20 extending axially and adapted to be secured to the rotational bearing element 1, and a flanged portion 21 extending from the axial outside toward the radial outside of the cylindrical portion 20. The seal ring 25 includes a cylindrical portion 23 extending axially and adapted be secured to the non-rotational bearing element 2 and a flanged portion 24 extending from the axial inside toward the radial inside of the cylindrical portion 23. The seal ring 24 further includes an elastic seal lip having its tip adapted to make sliding contact with the side of the slinger 22 facing opposite to the seal ring 25. In the embodiment shown in FIG. 3 that is conventional in this field, the elastic seal lip includes a radial lip 26, 27 extending diagonally toward the radial inside and toward the axial inside or outside, and an axial lip 28 extending diagonally toward the radial outside and toward the axial outside. An encoder 16 actuated magnetically for generating pulses is provided on the flanged portion 21 of the slinger 22, and a sensor 17 is located to face opposite to the encoder 16 for sensing the pulses from the encoder 16.

In the conventional seal with the integrated sealing and rotation measuring capabilities shown in FIG. 3 and described above, the encoder 16 and sensor 17 are located on the outermost side of the seal where they are exposed to the atmosphere. Thus, the encoder 16 and sensor 17 are always placed directly under unfavorable circumstances in which they can be affected by any splashing water or foreign matter. If the water should enter the seal with the integrated sealing and rotation measuring capabilities, it might cause rust to gather on the metal parts of the seal that would degrade the rotation detect capability. What is worse is that there is even the possibility that foreign matter might be attached to the parts of the seal. If any foreign matter could enter the area between the encoder 16 and sensor 17 where the foreign matter should be attached to the encoder 16 and/or sensor 17, the encoder 16 and/or sensor 17 might be damaged by the foreign matter biting the encoder 16 and/or sensor 17 during rotation of the wheel support bearing assembly. If this should occur, the rotation detection section composed of the encoder and sensor would not be able to detect the number of revolutions accurately, which would be a serious problem.

In most cases, the encoder 16 is attached to the flanged portion 21 of the slinger 22 that provides the sealing action, which imposes limitations on the choice of the material and shape of the encoder.

SUMMARY OF THE INVENTION

In light of the problems of the prior art seal with integrated sealing and rotation measuring capabilities described above, it is an object of the present invention to provide a seal with integrated sealing and wheel rotation detecting capabilities. In particular, the seal is designed so as to permit the rotation detecting section including the encoder and sensor to be adequately protected, and to be placed in the proper positions. The higher sensing performance and mechanical durability can also be provided.

In order to attain the above object, a seal with integrated sealing and measuring capabilities according to the present invention has the sealing and rotation measuring functions incorporated therein. This seal is installed on a wheel support bearing assembly on an automotive vehicle for sealing the wheel support bearing assembly comprising a rotational bearing element and a non-rotational bearing element rotating relative to each other. The seal with integrated sealing and rotation measuring capabilities of the present invention is constructed as described below.

The seal with integrated sealing and rotation measuring capabilities according to the present invention includes a first slinger having an L-shape cross section and a second slinger having an L-shape cross section and located axially inward from the first slinger, and the first and second slingers are disposed to have a U-shape configuration in cross section and be secured to the rotational bearing element. th The seal with the integrated sealing and rotation measuring capabilities according to the present invention further includes an encoder, a sensor located to face opposite the encoder, and a seal ring adapted to be secured to the non-rotational bearing element, all of which are arranged in the space defined between the first and second slingers.

DETAILED DESCRIPTION OF THE INVENTION

Figure 1:
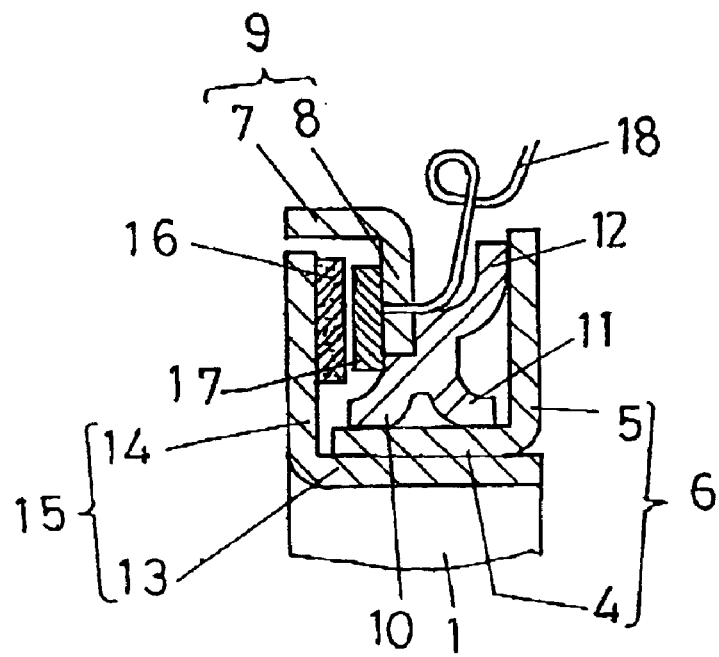
FIG. 1 is a sectional view illustrating a seal with integrated sealing and rotation measuring capabilities in accordance with one embodiment of the present invention, with some non-critical parts being omitted for the sake of simplicity.

The seal with the integrated sealing and rotation measuring capabilities according to the present invention is now described more specifically by referring to the drawings.

A first slinger 6 has an L-shaped cross section and includes a first cylindrical portion 4 extending axially and a first flanged portion 5 extending radially from the cylindrical portion 4. This first slinger 6 is secured to the rotational bearing element 1. A seal ring 9 is arranged axially inward from the first slinger 6 and is secured to the non-rotational bearing element 2. This seal ring 9 includes elastic seal lips 10, 11, 12 having respective tips adapted to make sliding contact with the side of the first slinger 6 facing the seal ring 9.

The second slinger 15 has an L-shaped cross section, is arranged axially inward from the seal ring 9, and includes a second cylindrical portion 13 extending axially and a second flanged portion 14 extending radially from the second cylindrical portion 13. The second slinger 15 is secured to the rotational bearing element 1.

The first slinger 6 having the L-shaped cross section and the second slinger 15 having the L-shaped cross section are secured to the rotational bearing element 1 in any of the following ways.

In the first way, the first cylindrical portion 4 of the first slinger 6 is secured to the rotational bearing element 1, and the second cylindrical portion 13 of the second slinger 15 is secured to the rotational bearing element 1 and/or to the first cylindrical portion 4 of the first slinger 6.

In the second way, the second cylindrical portion 13 of the second slinger 15 is secured to the rotational bearing element 1, and the first cylindrical portion 4 of the first slinger 6 is secured to the rotational bearing element 1 and/or to the second cylindrical portion 13 of the second slinger 15.

In the seal with the integrated sealing and rotation measuring capabilities according to the present invention, an encoder 16 that is actuated magnetically to generate pulses is disposed on the second flanged portion 14 of the second slinger 15, and a sensor 17 is arranged on the seal ring 9 in such a manner that it faces the encoder 16 and responds to the pulses from the encoder 16.

The first cylindrical portion 4 of the first slinger 6 having the L-shaped cross section and the second cylindrical portion 13 of the second slinger 15 having the L-shaped cross section can be joined together by fitting one into or around the other.

It is desirable that all of the components of the seal with the integrated sealing and rotation measuring capabilities of the present invention should previously be incorporated into a single unit before it is installed on the bearing assembly 3.

This way is particularly advantageous when the first cylindrical portion 4 of the first slinger 6 and the second cylindrical portion 13 of the second slinger 15 are joined together by fitting one into or around the other. The reason is that in this way, the components of the seal with integrated sealing and rotation measuring capabilities can be incorporated into a single unit, which can then be installed on the bearing assembly 3 with greater ease and with higher positional accuracy.

Which of the first cylindrical portion 4 of the first slinger 6 and the second cylindrical portion 13 of the second slinger 15 should be secured to the rotational bearing element 1 is not important. In the embodiment shown in FIG. 1, the second cylindrical portion 13 of the second slinger 15 is secured to the rotational bearing element 1, and the first cylindrical portion 4 of the first slinger 6 is fitted into the second cylindrical portion 13. In the embodiment shown in FIG. 2, the first cylindrical portion 4 of the first slinger 6 is secured to the rotational bearing element 1, and the second cylindrical portion 13 of the second slinger 15 is fitted into the first cylindrical portion 4. Which of the first cylindrical portion 4 of the first slinger 6 and the second cylindrical portion 13 of the second slinger 15 should be secured to the rotational bearing element 1 can be determined by considering the stability required for the seal lips 10, 11, 12 and 30 being inserted and the particular positional relationship between the sensor 17 and encoder 16.

In the seal with the integrated sealing and rotation measuring capabilities according the present invention that has been described above, the seal ring 9 may further include an elastic seal lip 30 having its lip adapted to make sliding contact with the side of the second cylindrical portion 13 of the second slinger 15 having the L-shape cross section facing the seal ring 9.

More specifically, the second slinger 15 having the L-shaped cross section is arranged axially inward (on the left side in FIGS. 1 and 2) of the seal ring 9, so that, according to the arrangement in which seal ring 9 further includes the elastic seal lip 30 having its tip adapted to make sliding contact with the side of the second cylindrical portion 13 of the second slinger 15 opposite the seal ring 9, the encoder 16 and sensor 17 can be isolated more effectively from the atmosphere.

In the seal with the integrated sealing and rotation measuring capabilities of the present invention described above, it may be understood that the encoder 16 is magnetically actuated to generate pulses, and the sensor 17 is located to face the encoder 16 for responding to the pulses. The encoder 16 and 17 are arranged axially inward from the seal ring 9, and are sealed by the elastic seal lips 10, 11, 12 and 30 in the seal ring 9. Thus, the encoder 16 and sensor 17 can be isolated from the outside by the elastic seal lips 10, 11, 12 and 30 of the seal ring 9. Furthermore, it may be understood that the first slinger 6 is arranged axially outward from the seal ring 9, with the tips of the elastic seal lips 10, 11, and 12 of the seal ring 9 being adapted to make sliding contact with the side (surface) of the first slinger 6 facing the seal ring 9.

Thus, the encoder 16 and sensor 17 that are arranged to face (oppose) opposite each other so that they can work together for detecting the number of revolutions can be protected adequately against the entry of any water or foreign matter from the outside.

It may be appreciated from the above that the encoder 16 and sensor 17 can be placed in a favorable environment where they can work without being affected by any external negative factors, such as damage, corruption, deterioration and the like. Thus, the encoder 16 and sensor 17 can operate and detect the number of revolutions accurately during an extended period of time without causing any functional errors. The seal with the integrated sealing and rotation measuring capabilities according to the present invention has been described in brief. It may be appreciated that the rotation detecting section including the encoder and sensor can be protected adequately, and can be placed in proper positions. A higher sensing performance and mechanical durability can also be provided.

Some preferred embodiments of the present invention will now be described by referring to the accompanying drawings. It should be noted that the seal with integrated sealing and rotation measuring capabilities according to the present invention that will be described below by referring to FIGS. 1 and 2 includes some parts or elements that are common to the prior art seal with integrated sealing and rotation measuring capabilities described above by referring to FIG. 3. Those common parts or elements are given the same reference numerals as those in the prior art seal with the integrated sealing and measuring capabilities. In the following description, those common parts or elements are not described to avoid duplication.

Figure 2:
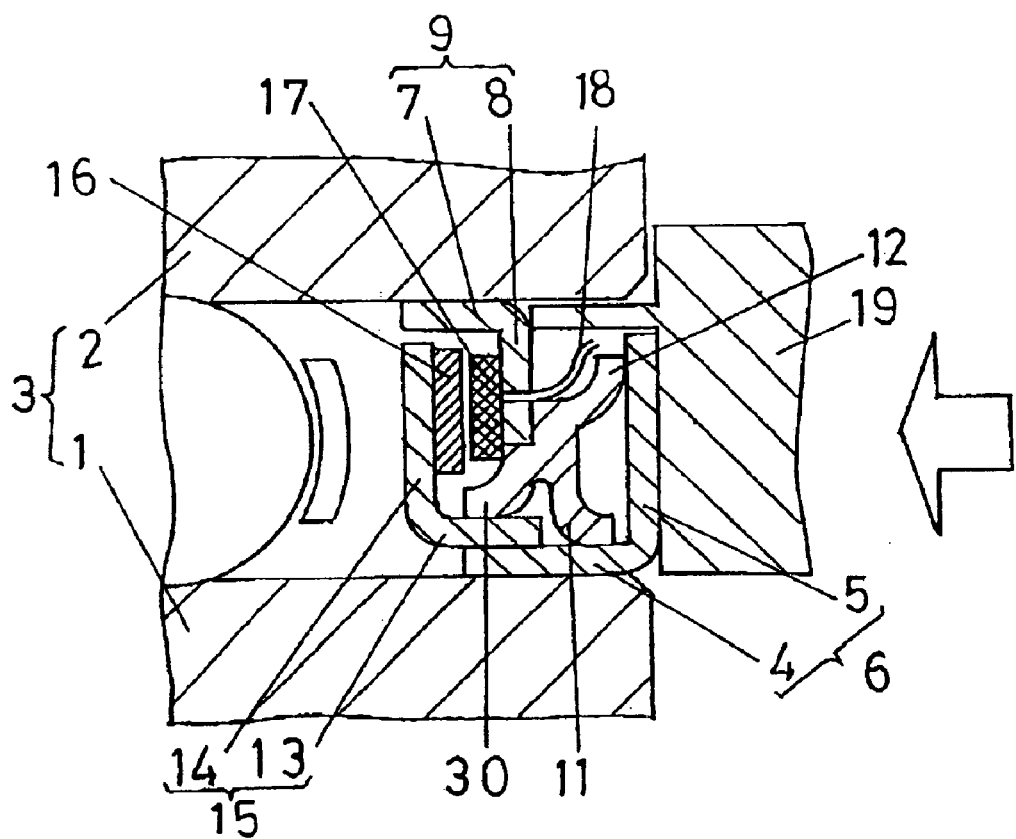
FIG. 2 is a sectional view illustrating a seal with integrated sealing and rotation measuring capabilities in accordance with another embodiment of the present invention, in which it is shown that the seal is mounted on the bearing assembly, with some non-critical parts being omitted for the sake of simplicity.
Figure 3:
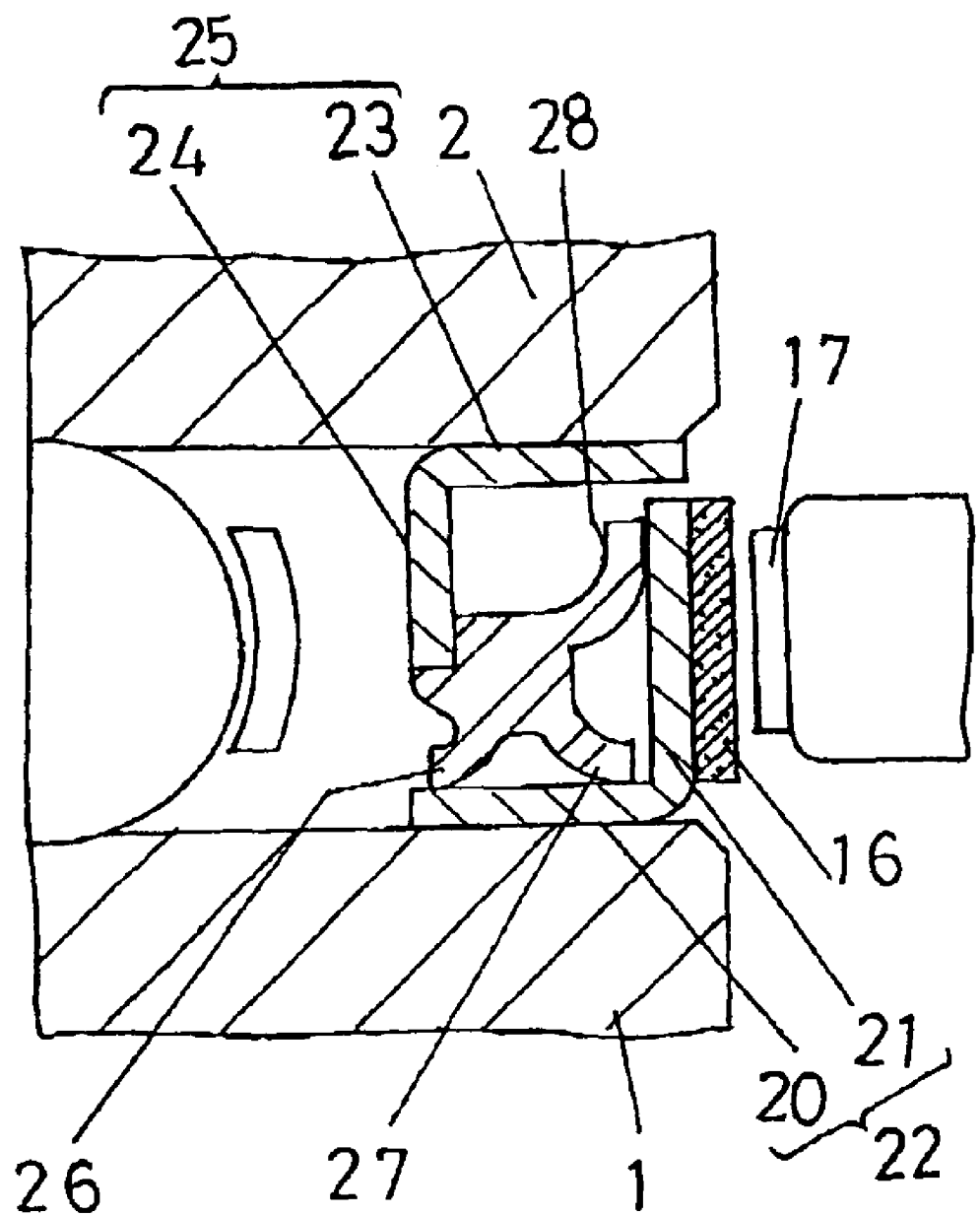
FIG. 3 is a sectional view illustrating a seal with integrated sealing and rotation measuring capabilities in accordance with the prior art, with some non-critical parts being omitted for the sake of simplicity.

By referring to FIGS. 1 and 2, the seal with integrated sealing and measuring capabilities according to the present invention has sealing and rotation measuring functions incorporated therein. This seal is installed on a wheel support bearing assembly 3 on an automotive vehicle for sealing the wheel support bearing assembly 3. The wheel support bearing assembly 3 includes, for example, a rotational bearing element 1 and a non-rotational bearing element 2 rotating relative to each other.

When the seal with integrated sealing and rotation measuring capabilities is installed on the wheel support bearing assembly 3, it can detect the number of revolutions for the wheel while it also sealing the wheel support bearing assembly 3.

The first slinger 6 having the L-shaped cross section includes the first cylindrical portion extending axially (in the horizontal direction in FIGS. 1 and 2) and the first flanged portion 5 extending radially (in the vertical direction in FIGS. 1 and 2) from the first cylindrical portion 4. In each of the embodiments shown in FIGS. 1 and 2, the first flanged portion 5 extends radially and outwardly from the axial outside end of the first cylindrical portion 4 (to the right of FIGS. 1 and 2).

The seal ring 9 includes a cylindrical portion 7 extending axially and a flanged portion 8 extending radially from the cylindrical portion 7. In each of the embodiments shown in FIGS. 1 and 2, the flanged portion 8 extends radially and outwardly from the axial outside end of the cylindrical portion 7.

The second slinger 15 having the L-shaped cross section includes a second cylindrical portion 13 extending axially and a second flanged portion 14 extending radially from the cylindrical portion 13. In each of the embodiments shown in FIGS. 1 and 2, the second flanged portion 14 extends radially and outwardly from the axial inner end of the second cylindrical portion 13.

The first slinger 6 having the L-shape cross section, the seal ring 9, and the second slinger 15 having the L-shape cross section may be made of metal, and may be obtained by using any of the methods that are known in the relevant field.

The seal ring 9 includes elastic seal lips 10, 11, 12, 30 that may be made of any of synthetic rubber, synthetic resin and the like, and may be attached to the flanged portion 8 of the seal ring 9 by using any of the methods that are known in the relevant field, such as the vulcanization process.

In each of the embodiments shown in FIGS. 1 and 2, some of the elastic seal lips such as 10, 11, and 30 are provided as radial lips that extend toward the radial inside and diagonally toward the axial inside or outside. The other elastic seal lip such as 12 is provided as an axial lip extending toward the radial outside and diagonally toward the axial outside, and is adapted to make sliding contact with the axial inside of the first flanged portion 5 of the first slinger 6.

In each of the embodiments shown in FIGS. 1 and 2, the encoder 16, which is actuated magnetically for generating pulses, is further included in the seal with the integrated sealing and rotation measuring capabilities. Specifically, the encoder 16 is disposed on the axial outside of the second flanged portion 14 of the second slinger 15 so that it can be sheltered.

The sensor 17 is disposed on the axial inside of the flanged portion 8 of the seal ring 9 to face the encoder 16 for responding to the pulses from the encoder 16. The output of the sensor 17 is connected to a signal wire 18.

The flanged portion 8 of the seal ring 9 has a hole or recess formed to permit the signal wire 18 to be passed therethrough. Alternatively, the flanged portion 8 of the seal ring 9 may have an elastic element embedded therein.

The encoder 16 that is actuated magnetically to produce pulses is an annular multi-pole magnet having S polarities and N polarities magnetized alternately around the circumference thereof. This annular multi-pole magnet may be any of the multi-pole magnets that are known in the relevant field. For example, the annular multi-pole magnet may be produced by adding powdery or granular forms of quench-hardened materials, deposit-hardened materials or sintered materials to any elastic element such as synthetic rubber, synthetic resin and the like, and forming the resulting product into an annular shape under applied pressure. Then, the annular shaped resulting product is combined with the second slinger 15 into a single unit by attaching the annular shaped resulting product to the axial outside of the second flanged portion 14 in the second slinger 15 by means of any adhesive medium. This annular shaped resulting product thus obtained is magnetized so that it can provide S polarities and N polarities alternately around the circumference thereof, and the resulting product is an annular encoder 16 that includes the combination of the annular multi-magnet and second slinger 15.

Another form of the encoder 16 is obtained as follows. The second slinger 15 that has a preliminary coating and adhesive coating on the axial outside of its flanged portion 14 may be placed into a mold together with an elastic element that contains any of the above-mentioned materials in powdery or granular forms. They may be joined together by vulcanizing them under applied heating and pressure. The result thus obtained has an annular form, which is then magnetized to provide S polarities and N polarities alternately around the circumference thereof. Finally, the encoder 16 is thus obtained, which is the annular multi-pole magnet and combined with second slinger 15.

It may be appreciated from the foregoing description that the seal with the integrated sealing and rotation measuring capabilities of the present invention includes the first slinger 6 having the L-shaped cross section and the second slinger 15 having the L-shaped cross section that is arranged axially inward from the first slinger 6. The first and second slingers 6 and 15 are joined together to have a U-shaped configuration in cross section, and are adapted to be secured to the rotational bearing element. Also, the seal with the integrated sealing and rotation measuring capabilities of the present invention further includes the encoder 16, the sensor 17 facing the encoder 16, and the seal ring 9 adapted to be secured to the non-rotational bearing element. The above-mentioned encoder 16, sensor 17 and seal ring 9 are arranged in the space defined between the above-described first slinger 6 and second slinger 15.

What is important in the seal with the integrated sealing and rotation measuring capabilities of the present invention is that the components that make up the seal with the integrated sealing and rotation measuring capabilities are placed and assembled in such a manner that the encoder 16 and the sensor 17 facing the encoder 16 can be sealed and isolated from the outside by means of the elastic seal lips of the seal ring 9, and that the seal with the integrated sealing and rotation measuring capabilities is installed on the wheel support bearing assembly 3 with the above-described components being assembled as described.

Preferably, the seal with the integrated sealing and rotation measuring capabilities of the present invention should be installed on the bearing assembly 3 after all of its components have been preassembled into a single unit.

The first cylindrical portion 4 of the first slinger 6 and the second cylindrical portion 13 of the second slinger 15 may be joined together by fitting one into or around the other as shown in FIGS. 1 and 2. In this way, all components may be pre-assembled into a single unit, and then this single unit may be installed on the bearing assembly 3. This has an advantage in that the single unit can be mounted on the bearing assembly with ease and with positional accuracy.

When the seal with the integrated sealing and rotational measuring capabilities of the present invention is installed on the bearing assembly 3 after all of its components have been pre-assembled into the single unit, each of the individual components may be mounted on the bearing assembly 3 by pushing, fitting and fixing the components under applied pressure, as indicated by the arrow in FIG. 2 by using the pushing tool 19 shown in FIG. 2.

In the embodiment shown in FIG. 1, it is desirable that the seal ring 9 and the second slinger 15 be pushed into the bearing assembly 3 under the applied pressure at the same time, with the first cylindrical portion 4 of the first slinger 6 and the second cylindrical portion 13 of the second slinger 15 being joined together by fitting one into or around the other.

In the embodiment shown in FIG. 2, it is desirable that the seal ring 9 and the first slinger 6 be pushed into the bearing assembly 3 under the applied pressure at the same time, with the second cylindrical portion 13 of the second slinger 15 and the first cylindrical portion 4 of the first slinger 6 being joined together by fitting one into or around the other.

In either of the above ways, the first slinger 6, the seal ring 9 and the second slinger 15 can be mounted as they are properly kept spaced from each other.

The seal with the integrated sealing and rotation measuring capabilities of the present invention can be completed by pushing, fitting and fixing the pre-assembled individual components under the applied pressure by using the pushing tool 19 shown in FIG. 2, in either of the manners described above.

In each of the embodiments shown in FIGS. 1 and 2, the flanged portion 8 extends radially inwardly from the axial outside end of the cylindrical portion 7 of the seal ring 9. Alternatively, although it is not shown, the flanged portion 8 can extend radially inwardly from the axial inside end of the cylindrical portion 7 of the seal ring 9.

In each of the embodiments shown in FIGS. 1 and 2, the rotational bearing element corresponds to the inner race, wherein the respective flanged portions 5, 14 of the first and second slingers 6, 15 extend radially outwardly, and the flanged portion 8 of the seal ring 9 extends radially and inwardly.

It should be understood, although it is not shown, that the rotational bearing element can be changed as it corresponds to the outer race. In this case, the respective cylindrical portions 4, 13 of the first and second slingers 6, 15 may be secured to the outer race, or the rotational bearing element in this case, wherein the flanged portions 5, 14 may extend radially inwardly. The cylindrical portion 7 of the seal ring 9 may be secured to the inner race, namely, the non-rotational bearing element in this case, wherein the flanged portion 8 may extend radially and outwardly. This variation can provide the rotation detect performance that is equivalent to each of the original embodiments shown in FIGS. 1 and 2, although a different construction is employed.

In the embodiment shown in FIG. 2, the second cylindrical portion 13 of the second slinger 15 is relatively short, with the elastic seal lip 11 making sliding contact with the first cylindrical portion 4 of the first slinger 6, and with the elastic seal lip 30 making sliding contact with the second cylindrical portion 13 of the second slinger 15. In this way, the contacts of the elastic seal lips can be distributed evenly.

The embodiment shown in FIG. 2 may also be applied to the first slinger 6. That is, in the embodiment shown in FIG. 1, although it is not shown, the first cylindrical portion 4 of the first slinger 6 may be changed to be relatively short, with the elastic seal lip 11 making sliding contact with the first cylindrical portion 4 of the first slinger 6 and with the elastic seal lip 10 making sliding contact with the second cylindrical portion 13 of the second slinger 15.

In each of the embodiments shown in FIGS. 1 and 2, either of the first cylindrical portion 4 of the first slinger 6 and the second cylindrical portion 13 of the second slinger 15 are secured to the rotational bearing element 1, and the cylindrical portion of the slinger that is not secured to the rotational bearing element 1 is secured to the cylindrical portion of the slinger that is secured to the rotational bearing element 1.

The embodiment shown in FIG. 1 or 2 may be varied such that both of the first cylindrical portion 4 of the first slinger 6 and the second cylindrical portion 13 of the second slinger 15 are secured to the rotational bearing element 1. Also, it can be varied such that both the first cylindrical portion 4 and the second cylindrical portion 13 are secured to the rotational bearing element 1, and the tips of the first and second cylindrical portions 4 and 13 facing opposite each other are jointed together by fitting one into or around the other.

As the before described, the seal with the integrated sealing and rotation measuring capabilities of the present invention includes the first slinger 6 having the L-shape cross section and the second slinger 15 having the L-shaped cross section that is arranged axially inward from the first slinger 6. The first and second slingers 6 and 15 are joined together to have a U-shaped configuration in cross section, and are adapted to be secured to the rotational bearing element. Also, the seal with the integrated sealing and rotation measuring capabilities of the present invention further includes the encoder 16, the sensor 17 facing (opposing) the encoder 16, and the seal ring 9 adapted to be secured to the non-rotational bearing element. The above-described encoder 16, sensor 17 and seal ring 9 are arranged in the space defined between the above-described first slinger 6 and second slinger 15. The above-described constitution is important for the present invention. Thus, the embodiment shown in FIG. 1 or 2 may be varied such that both of the first cylindrical portion 4 and second cylindrical portion 13 are secured to the rotational bearing element 1. Also, it can be varied such that both of the first cylindrical portion 4 and second cylindrical portion 13 are secured to the rotational bearing element 1, and the tips of the first and second cylindrical portions 4 and 13 facing opposite each other are jointed together by fitting one into or around the other.

Although the present invention has been described with reference to the several particular embodiments thereof, it should be understood that the present invention is not limited to those embodiments, and various changes and modifications may be made without departing from the spirit and scope of the invention as defined in the appended claims.

What is claimed is:

1. A seal with integrated sealing and rotation measuring capabilities to be installed on a wheel support bearing assembly including a non-rotational bearing element and a rotational bearing element capable of rotating relative to the non-rotational bearing element, comprising:

a first slinger having an L-shaped cross section including a first cylindrical portion extending axially and a first flanged portion extending radially from said first cylindrical portion;

a seal ring arranged axially inward of said first slinger and to be secured to the non-rotational bearing element, said seal ring including an elastic seal lip having a tip making sliding contact with a surface of said first slinger facing said seal ring;

a second slinger arranged axially inward of said seal ring, said second slinger having an L-shaped cross section including a second cylindrical portion extending axially and a second flanged portion extending radially from said second cylindrical portion, said second cylindrical portion to be secured to the rotational bearing element, said first cylindrical portion of said first slinger being secured to said second cylindrical portion of said second slinger; and an encoder operable to generate pulses, said encoder being arranged on said second flanged portion of said second slinger; and a sensor facing said encoder and operable to respond to the pulses generated by said encoder.

2. The seal of claim 1, wherein said first cylindrical portion and said second cylindrical portion are joined together by fitting one of said first cylindrical portion and said second cylindrical portion into or around the other of said first cylindrical portion and said second cylindrical portion.

3. The seal of claim 1, wherein said elastic seal lip of said seal ring comprises a first elastic seal lip, said seal ring further including a second elastic seal lip having a tip making sliding contact with a surface of said second cylindrical portion facing said seal ring.

4. The seal of claim 1, wherein said elastic seal lip of said seal ring comprises a first elastic seal lip having a portion extending in a radially inward direction and a portion extending in an axially inward direction so as to make sliding contact with a surface of said first cylinder portion of said first slinger, said seal ring further including a second elastic seal lip having a portion extending in a radially inward direction and a portion extending in an axially outward direction so as to make sliding contact with said surface of said first cylinder portion, and said seal ring further including a third elastic seal lip having a portion extending in an axially outward direction and a portion extending in an radially outward direction so as to make sliding contact with an inner surface of said first flanged portion of said first slinger.

5. The seal of claim 1, wherein said elastic seal lip of said seal ring comprises a first elastic seal lip having a portion extending in a radially outward direction and a portion extending in an axially inward direction so as to make sliding contact with a surface of said first cylinder portion of said first slinger, said seal ring further including a second elastic seal lip having a portion extending in a radially outward direction and a portion extending in an axially outward direction so as to make sliding contact with said surface of said first cylinder portion, and said seal ring further including a third elastic seal lip having a portion extending in an axially outward direction and a portion extending in an radially inward direction so as to make sliding contact with an inner surface of said first flanged portion of said first slinger.

6. The seal of claim 1, wherein said first slinger, said seal ring, said second slinger, said encoder, and said sensor are incorporated into a single unit for installation on the wheel support bearing assembly.

7. The seal of claim 1, wherein each of said first cylindrical portion of said first slinger and said second cylindrical portion of said second slinger has an inner surface closest to the rotational bearing element and an outer surface opposite said inner surface and farthest from the rotational bearing element, said outer surface of said first cylindrical portion being overlaid on said inner surface of said second cylindrical portion.

8. A seal with integrated sealing and rotation measuring capabilities to be installed on a wheel support bearing assembly including a non-rotational bearing element and a rotational bearing element capable of rotating relative to the non-rotational bearing element, comprising:

a first slinger having an L-shaped cross section including a first cylindrical portion extending axially and a first flanged portion extending radially from said first cylindrical portion, said first cylindrical portion to be secured to the rotational bearing element;

a seal ring arranged axially inward of said first slinger and to be secured to the non-rotational bearing element, said seal ring including an elastic seal lip having a tip making sliding contact with a surface of said first slinger facing said seal ring;

a second slinger arranged axially inward of said seal ring, said second slinger having an L-shaped cross section including a second cylindrical portion extending axially and a second flanged portion extending radially from said second cylindrical portion, said second cylindrical portion of said second slinger being secured to said first cylindrical portion of said first slinger; and an encoder operable to generate pulses, said encoder being arranged on said second flanged portion of said second slinger; and a sensor facing said encoder and operable to respond to the pulses generated by said encoder.

9. The seal of claim 8, wherein said first cylindrical portion and said second cylindrical portion are joined together by fitting one of said first cylindrical portion and said second cylindrical portion into or around the other of said first cylindrical portion and said second cylindrical portion.

10. The seal of claim 8, wherein said elastic seal lip of said seal ring comprises a first elastic seal lip, said seal ring further including a second elastic seal lip having a tip making sliding contact with a surface of said second cylindrical portion facing said seal ring.

11. The seal of claim 8, wherein said elastic seal lip of said seal ring comprises a first elastic seal lip having a portion extending in a radially inward direction and a portion extending in an axially inward direction so as to make sliding contact with a surface of said second cylinder portion of said second slinger, said seal ring further including a second elastic seal lip having a portion extending in a radially inward direction and a portion extending in an axially outward direction so as to make sliding contact with a surface of said first cylinder portion, and said seal ring further including a third elastic seal lip having a portion extending in an axially outward direction and a portion extending in an radially outward direction so as to make sliding contact with an inner surface of said first flanged portion of said first slinger.

12. The seal of claim 8, wherein said elastic seal lip of said seal ring comprises a first elastic seal lip having a portion extending in a radially outward direction and a portion extending in an axially inward direction so as to make sliding contact with a surface of said second cylinder portion of said second slinger, said seal ring further including a second elastic seal lip having a portion extending in a radially outward direction and a portion extending in an axially outward direction so as to make sliding contact with a surface of said first cylinder portion, and said seal ring further including a third elastic seal lip having a portion extending in an axially outward direction and a portion extending in an radially inward direction so as to make sliding contact with an inner surface of said first flanged portion of said first slinger.

13. The seal of claim 8, wherein said first slinger, said seal ring, said second slinger, said encoder, and said sensor are incorporated into a single unit for installation on the wheel support bearing assembly.

14. The seal of claim 8, wherein each of said first cylindrical portion of said first slinger and said second cylindrical portion of said second slinger has an inner surface closest to the rotational bearing element and an outer surface opposite said inner surface and farthest from the rotational bearing element, said outer surface of said second cylindrical portion being overlaid on said inner surface of said first cylindrical portion.

15. A seal with integrated sealing and rotation measuring capabilities to be installed on a wheel support bearing assembly including a non-rotational bearing element and a rotational bearing element capable of rotating relative to the non-rotational bearing element, comprising:
   a first slinger having an L-shaped cross section including a first cylindrical portion extending axially and a first flanged portion extending radially from said first cylindrical portion, said first cylindrical portion to be secured to the rotational bearing element;
   a seal ring arranged axially inward of said first slinger and to be secured to the non-rotational bearing element, said seal ring including an elastic seal lip having a tip making sliding contact with a surface of said first slinger facing said seal ring;
   a second slinger arranged axially inward of said seal ring, said second slinger having an L-shaped cross section including a second cylindrical portion extending axially and a second flanged portion extending radially from said second cylindrical portion, said first cylindrical portion to be secured to the rotational bearing element, a tip of said second cylindrical portion of said second slinger being secured to a tip of said first cylindrical portion of said first slinger; and
   an encoder operable to generate pulses, said encoder being arranged on said second flanged portion of said second slinger; and
   a sensor facing said encoder and operable to respond to the pulses generated by said encoder.

16. The seal of claim 15, wherein said first cylindrical portion and said second cylindrical portion are joined together by fitting one of said first cylindrical portion and said second cylindrical portion into or around the other of said first cylindrical portion and said second cylindrical portion.

17. The seal of claim 15, wherein said elastic seal lip of said seal ring comprises a first elastic seal lip, said seal ring further including a second elastic seal lip having a tip making sliding contact with a surface of said second cylindrical portion facing said seal ring.

18. The seal of claim 15, wherein said first slinger, said seal ring, said second slinger, said encoder, and said sensor are incorporated into a single unit for installation on the wheel support bearing assembly.

* * * * *